TEMPERATURE-COMPENSATED SEMI-CONDUCTOR SIGNAL AMPLIFIER CIRCUITS

Filed May 25, 1954

INVENTORS
William H. Poucel &
John W. Woestman

BY H. W. Newton
ATTORNEY 2,808,471

TEMPERATURE-COMPENSATED SEMI-CONDUCTOR SIGNAL AMPLIFIER CIRCUITS

William H. Poucel, Haddonfield, and John W. Woestman, Palmyra, N. J., assignors to Radio Corporation of America, a corporation of Delaware Application May 25, 1954, Serial No. 432,176

3 Claims. (Cl. 179—171)

Figure 1:
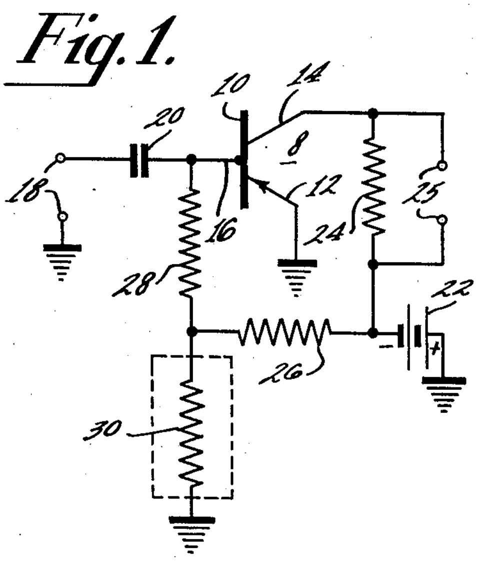

This invention relates in general to signal conveying and other electrical circuits which utilize semi-conductor devices as active signal amplifying and translating elements, and in particular to means for stabilizing such circuits with temperature variations.

The development of commercially useful semi-conductor devices such as transistors has had a pronounced effect upon and has caused the introduction of many new techniques in the electronic signal communication field. Transistors have many advantages including their small size and durability, especially when compared with the ordinary vacuum tube. In addition, they require no heater power and consist of materials which appear to have a long useful life. Consequently, the use of transistors in signal conveying and other electrical circuits has been, and is, the subject of extensive investigation.

While possessing all of the above as well as other advantages, transistors are known to be highly temperature sensitive. Thus, variations in the ambient temperature as well as variations due to the heat dissipation from the transistors themselves will affect their operation to a considerable extent in some cases. These temperature variations may cause changes in certain parameters and operating characteristics of the transistors to the extent that their operation may become unstable and, therefore, unreliable. Various methods and systems have been tried in an attempt to compensate for these undesirable changes. Many of the known methods, however, have not been found to compensate for temperature variations as adequately and completely as needed for most efficient operation.

It is known that for most efficient operation and minimum distortion, a transistor requires a certain optimum forward bias voltage between its emitter and base electrodes. Furthermore, it has been found that this biasing voltage is very sensitive to changes in temperature. Accordingly, unless provision is made to compensate for the changing requirements of the forward emitter-to-base voltage with temperature changes, distortion will result and the direct current collector current will change.

One of the factors or characteristics of junction transistors which makes the forward emitter-to-base voltage sensitive to temperature as mentioned above is the base saturation current of the transistor, that is, the base current that flows for collector saturation. Changes of temperature will also change the base saturation current. Accordingly, as a prerequisite to stable and efficient operation of signal conveying circuits employing transistors, some means must be provided to compensate for the variations of the base saturation current with temperature variations. Preferably this means should not involve the use of either complicated circuitry or costly extra circuit elements, particularly for commercial applications where cost is a consideration. Moreover, compensation should preferably be achieved without adversely affecting other circuit characteristics, such as circuit gain.

Accordingly, it is an object of the present invention to provide an improved semi-conductor signal conveying circuit wherein means are provided for stabilizing the circuit with temperature variations.

It is another object of the present invention to provide an improved signal conveying circuit utilizing transistors as the signal amplifying elements thereof which is characterized by stable and highly efficient operation over a wide range of ambient temperatures.

It is a further object of the present invention to provide an improved and economical temperature compensating network for a semi-conductor signal translating or amplifying device which provides stable, efficient and substantially distortion-free operation despite changes in the ambient temperature.

It is another object of the present invention to provide improved signal amplifying circuits utilizing transistors which provide stable operation with temperature variations and utilize a minimum number of circuit elements.

These and further objects and advantages are achieved, in general, by connecting a temperature compensating T-network with a transistor in such a manner that the effects due to changes of base saturation current with temperature variations are compensated for. One of the impedance elements of the T-network is a thermally sensitive resistance device, such as, by way of example, a thermistor. One end of the thermistor is connected to a point of reference potential, such as ground for the system, and the other end is connected to a point intermediate the other two arms of the network each of which includes an impedance element. The remaining pair of network terminals are connected with the base and collector respectively of the transistor. By this expedient, compensation as above discussed for temperature variations is achieved, and stable and distortion-free operation is provided despite serious changes in ambient temperature.

Figure 2:
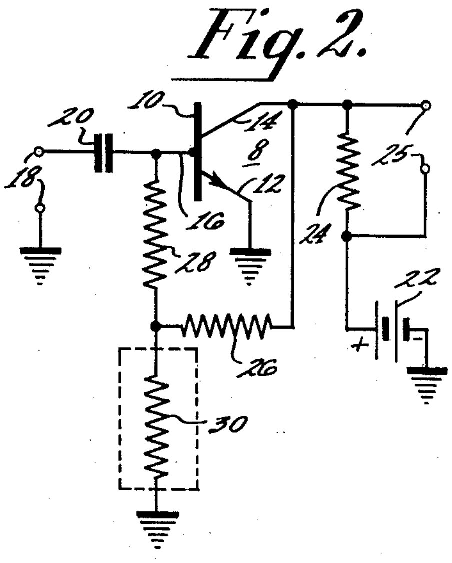
Figure 3:
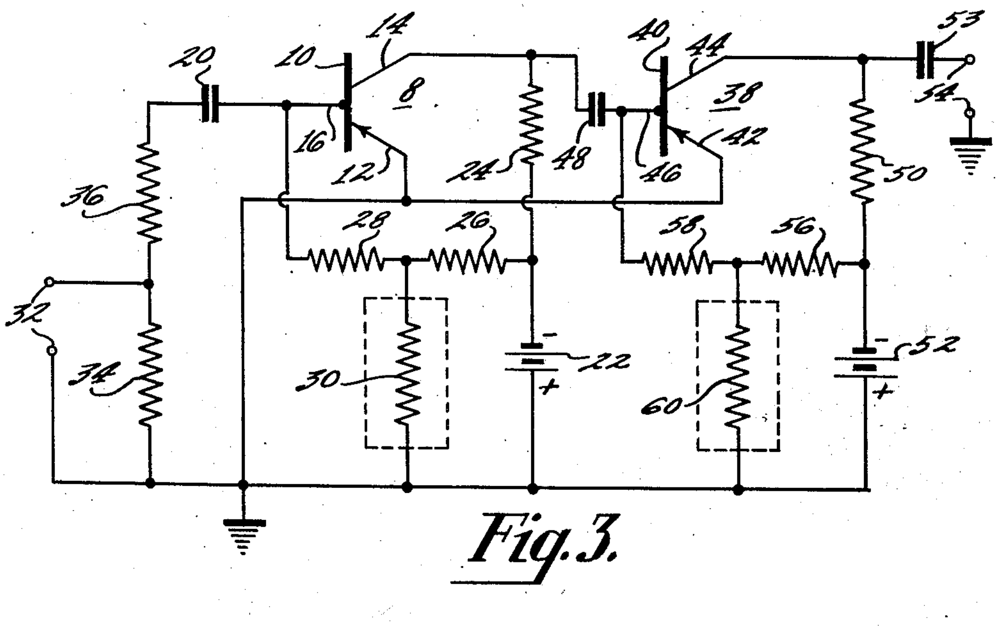

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1 and 2 are schematic circuit diagrams of signal conveying transistor circuits which are compensated for temperature variations in accordance with the invention; and Figure 3 is a schematic circuit diagram of a two-stage signal amplifying transistor circuit which is compensated for temperature variations in accordance with the present invention.

Referring now to the drawing wherein like parts are indicated by like reference numerals throughout the figures, and referring particularly to Figure 1, a semi-conductor device 8 such as, by way of example, a P–N–P junction transistor includes a semi-conductive body 10 having three contacting electrodes cooperatively associated therewith. These electrodes are designated as an emitter 12, a collector 14 and a base 16. It should be understood throughout the description of the drawings that the use of P–N–P junction transistors is by way of example only, and the principles of the invention are not in any way limited to any one specific type of semi-conductor device or transistor. Accordingly, the principles of the present invention will be applicable to other semi-conductor devices which have characteristics similar to those of P–N–P junction transistors. Moreover, the invention is not limited to any one conductivity type of semi-conductor device. As an example, N–P–N junction transistors could be used, as will be seen from a consideration of Figure 2, so long as the polarity of the bias supply means is reversed.

The input circuit for the transistor 8 comprises a pair of input terminals 18 one of which is connected to a point of fixed reference potential or ground for the system, and the other of which is connected through a coupling capacitor 20 to the base 16 of the transistor 8. The emitter 12 of the transistor 8 is connected directly with a point of fixed reference potential or ground for the system as shown. Hence, if a source of signal energy is coupled to the input terminals 18, signals will be coupled between the base 16 and the emitter 12 of the transistor 8.

Energization or biasing potentials for the transistor 8 are provided by a source of direct current potential such as illustrated by a battery 22, the positive terminal of which is grounded and the negative terminal of which is connected through a load resistor 24 to the collector 14 of the transistor 8. Output signal energy may be derived across the load resistor 24, and for this purpose a pair of output terminals 25 are provided which are connected to either end of the load resistor 24.

Base biasing voltage for the transistor 8 is also provided by connecting the negative terminal of the battery 22 through a pair of resistors 26 and 28, which comprise, in accordance with the teachings of this invention, two arms of a temperature compensating T-network, to the base 16 of the transistor. The biasing will thus be recognized as being proper for the amplifying action of a P–N–P junction transistor. Accordingly, the collector is referred to as being biased in the relatively non-conducting or reverse direction with respect to the base 16. The emitter 12 of the transistor 8 is, on the other hand, referred to as being biased in the relatively conducting or forward direction with respect to the base 16.

The other arm of the temperature compensating T-network comprises, in accordance with the present invention, a temperature compensating resistance device 30, such as a thermistor, which is connected from the junction of the resistors 26 and 28 to the point of fixed reference potential or ground for the system. Thermistors, as is well known, are made from a semiconductive material such as uranium oxide or silver sulfide. The specific resistance of such devices decreases rapidly with increases in temperature, that is, they are referred to as having a negative temperature coefficient. It should be understood that the resistors 26 and 28 may comprise one resistor, in which case the thermistor 30 would be connected to an intermediate point on the single resistor.

Experimental evidence indicates that one of the prime factors or characteristics of transistors which made their optimum bias highly temperature sensitive is the base saturation current of the transistor. This current is defined as the base current that flows for collector saturation. The base saturation current flows through the base lead of the transistor. Since the base lead of the transistor had resistance, a voltage drop is created across this resistance due to the flow of base saturation current which creates an internal bias for the transistor. Furthermore, the base saturation current increases with increases of temperature. Hence, an internal bias which varies with temperature is established by the variations of base saturation current flow. It is in this manner that the bias for the transistor varies with temperature which may cause unstable and unreliable operation.

Thus, to provide stable, distortion-free and highly efficient operation of a transistor, some means must be provided to offset the adverse effects of the base saturation current variations with temperature variations. This is accomplished, in accordance with the present invention, by the provision of the temperature compensating T-network as described above.

It is evident, from a consideration of Figure 1, that the resistor 26 in series with the parallel series combination of resistor 28, the input resistance of the transistor 8 and the thermistor 30 forms a voltage divider circuit such that:

$$V_{30}=E-V_{26}$$

where:

$V_{30}$=voltage drop across the thermistor 30
$V_{26}$=voltage drop across the resistor 26, and
$E$=voltage of the battery 22

Thus, it is evident that:

$$V_{30}=\left(\frac{E}{\frac{R_{28}R_{30}+R_bR_{30}}{R_{28}+R_b+R_{30}}}+R_{26}\right)\left(\frac{R_{28}R_{30}+R_bR_{30}}{R_{28}+R_b+R_{30}}\right)$$

where:

$R_{26}$=resistance of the resistor 26
$R_{28}$=resistance of the resistor 28
$R_{30}$=resistance of the thermistor 30, and
$R_b$=input resistance of the transistor 8

If, however, the resistance of the resistor 28 ($R_{28}$) is made very much larger than the input resistance of the transistor 8 ($R_b$), $R_b$ may be eliminated from the foregoing equation. The equation thus reduces to:

$$V_{30}=\left(\frac{E}{\frac{R_{28}R_{30}}{R_{28}+R_{30}}}+R_{26}\right)\left(\frac{R_{28}R_{30}}{R_{28}+R_{30}}\right)$$

The total base current ($I_b$) which includes the base saturation current of the transistor 8 can be given as:

$$I_b=\frac{V_{30}}{R_{28}}$$

By substituting the preceding equation in the last equation it is seen that:

$$I_b=\left[\frac{E}{R_{28}R_{30}+R_{26}(R_{28}+R_{30})}\right]R_{30}$$

It is readily apparent, therefore, that if the base saturation current of the transistor increases, due to, for example, an increase in the ambient temperature, thus tending to increase the current $I_b$, its effects will be offset by a corresponding decrease in the resistance $R_{30}$. Since the resistance $R_{30}$ is the resistance of the thermistor 30, this result is seen to be accomplished by provision of the present invention. Thus, by utilizing a temperature compensating T-network which includes a thermistor in conjunction with a transistor, in accordance with the teachings of the present invention, the desired compensation over a wide range of temperature variation is accomplished.

By utilizing a thermistor for temperature compensation purposes, the resistance of the resistor 26 should be chosen so that it is large enough to limit the current through the thermistor 30 to the proper value. Unless this is done, the self-heating effect of the thermistor will influence the behavior of its resistance characteristics. Thus, the resistor 26, in addition to its function as one of the voltage dividing elements in the compensating network is also a current limiting means insuring proper operation of the thermistor.

Since the input resistance ($R_b$) of the transistor is relatively low, the resistor 28 must also be employed to insure proper temperature compensation. If the resistor 28 is eliminated, the thermistor 30 would be connected directly to the base and the available output signal would be decreased due to the low impedance path presented to the input signal through the thermistor 30 to ground. Experimental evidence has indicated that since the input resistance ($R_b$) of the transistor is relatively low, the resistance of the thermistor 30 must also be chosen to be relatively low in order to provide the proper changes in base current for compensation purposes.

Thus, without the resistor 28 in the compensating network, proper control of the base current by the thermistor 30 alone would not be possible if the resistance of the thermistor 30 were chosen to be substantially greater than the input resistance of the transistor 8. Conversely if the thermistor 30 were used alone and its resistance selected to be low enough so as to afford proper base current control, the proper development of the signal would be interfered with. The resistor 28, therefore, plays an exceedingly important role in the temperature compensating T-network comprising the present invention, and is large enough to prevent a portion of the input signal from being by-passed to ground.

As described, it is evident that by provision of the present invention changes in the base saturation current of the transistor 8, due to changes of the ambient temperature will be fully compensated for without impairing the signal handling capabilities of the circuit. Thus stable and distortion-free operation is insured without sacrificing circuit efficiency.

While it will be understood that the circuit specifications may vary according to the design for any particular application, the following circuit specifications are included by way of example only:

| | |
|---|---|
| Transistor **8** | RCA type 2N34. |
| Capacitor **20** | 0.1 microfarad. |
| Resistors **24, 26** and **28** | 2700; 90,000; and 24,000 ohms, respectively. |
| Battery **22** | 15 volts. |

It is also possible for some applications, in accordance with the invention, to connect the resistor 26 directly with the collector 14 rather than through the load resistor 24 as illustrated and described in connection with Figure 1. This aspect of the invention is illustrated in Figure 2 where the transistor 8 has also been illustrated as being of the N–P–N junction type. For this purpose, proper biasing potentials for the electrodes of the transistor 8 are provided by grounding the negative terminal of the biasing battery 22, and connecting its positive terminal through the load resistor 24 to the collector 14, and through the resistors 26 and 28 of the temperature compensating T-network to the base 16 of the N–P–N junction transistor 8. In other aspects, the circuit illustrated in Figure 2 is seen to be identical with the one illustrated in Figure 1 of the drawing.

The principles of the present invention are applicable to multi-stage amplifier circuits. Thus, for example, as illustrated in Figure 3 of the drawing, a two-stage amplifier circuit comprises a pair of P–N–P junction transistors 8 and 38 connected in cascade relation. The transistor 8 is connected in the same manner as in Figure 1 except for its input circuit. Thus, the base 16 is connected through the coupling capacitor 20 and a pair of serially connected resistors 36 and 34 to the system ground. The input terminals 32 for the amplifier circuit are connected across the resistor 34.

The output or collector electrode 14 of the transistor 8 is connected through a coupling capacitor 48 to the input or base electrode 46 of the second transistor amplifier 38. The transistor amplifier 38 is of the P–N–P junction type and comprises a semi-conductive body 40 and three electrodes which are cooperatively associated therewith and which are designated as an emitter 42, a collector 44 and a base 46. The common or emitter electrodes of the transistors 8 and 38 are connected together and to the point of fixed reference potential or ground for the system as shown.

Proper biasing as well as temperature compensation, as taught by the novel provisions of the present invention, for the second transistor 38 are provided in the same manner as for the transistor 8. Thus, a biasing battery 52 has its positive terminal grounded and its negative terminal connected through a load resistor 50 to the collector 44, and through a pair of serially connected resistors 56 and 58 of the temperature compensating T-network to the base 46 of the transistor 38. It should be understood, however, that a single biasing battery may be utilized to provide biasing potentials for both transistors in a well known manner. In addition, a thermistor

60 is connected from a point intermediate the resistors 56 and 58 to system ground. Output signals may be taken from a pair of output terminals 54, one of which is grounded and the other of which is connected through a coupling capacitor 53 to the collector 44 of the transistor 38.

The invention is thus seen to be applicable to multi-stage signal translating or amplifying circuits in which each transistor stage may be similarly compensated for ambient temperature variations. Moreover, only one or selected ones of the transistors may be compensated, with the others being uncompensated in accordance with the requirements of the particular circuit application. In addition, it should be noted that an amplifier of this type, which is compensated for temperature variations in accordance with the teachings of the present invention, may find application in all kinds of signal receiving and other signal conveying and translating systems.

It should be apparent that by provision of the present invention, stabilization of signal amplifying circuits employing transistors with temperature variations is easily accomplished. Accordingly, by compensating for the effects of base saturation current variations with a temperature compensating T-network, stable and efficient operation is achieved over a wide range of temperatures. Moreover, these results are achieved without adding appreciably to the cost of the circuits. Hence, circuits constructed in accordance with the present invention are characterized not only by stable and efficient, but relatively inexpensive operation as well.

What is claimed is:

1. A stabilized signal translating circuit comprising, in combination, a transistor having a base, an emitter, and a collector electrode; means providing an input circuit connected for applying an input signal between said base and emitter electrodes; means providing an output circuit connected for deriving an output signal between said collector and emitter electrodes; means providing a direct current supply source having a first and a second terminal; said second terminal being connected to a point of ground potential in said circuit; means connecting said first terminal with said collector electrode for applying biasing potentials thereto; means connecting said emitter electrode with said second terminal; and a temperature compensating T-network for stabilizing the operation of said transistor over a wide range of ambient temperature variation and providing efficient operation of said circuit comprising a first and a second resistor connected in series in the order named between said base and collector electrodes, and a temperature sensitive impedance element having a relatively low resistance and a negative temperature coefficient of resistance connected from the junction of said first and second resistors to the second terminal of said supply source, said first resistor having resistance of a large enough magnitude to prevent shunting of an applied input signal to ground, and said second resistor having resistance larger than the resistance of said first resistor and of a sufficient magnitude to limit current flow through said temperature sensitive impedance element to a value whereby the resistance of said temperature sensitive impedance element is not appreciably varied by current flow therethrough.

2. A stabilized signal translating circuit comprising, in combination, a transistor having a base, an emitter, and a collector electrode; means providing an input circuit connected for applying an input signal between said base and emitter electrodes; means providing a direct current supply source having a first and a second terminal; said second terminal being connected to a point of ground potential in said circuit; load impedance means connecting said collector electrode with said first terminal for applying biasing potentials to said collector electrode and providing an output circuit for said transistor; means connecting said emitter electrode with said second terminal; and a temperature compensating T-network for stabilizing the operation of said transistor over a wide range of ambient temperature variation comprising a first and a second resistor connected in series in the order named between said base electrode and said first terminal of said source, and a thermistor of relatively low resistance connected from the junction of said first and second resistors to the second terminal of said supply source, said first resistor having resistance of a large enough magnitude to prevent shunting of an applied input signal to ground, and said second resistor having resistance larger than the resistance of said first resistor and of a sufficient magnitude to limit current flow through said thermistor to a value whereby the resistance of said thermistor is not appreciably varied by current flow therethrough.

3. A stabilized signal translating circuit comprising, in combination, a transistor having a base, an emitter, and a collector electrode; means providing an input circuit connected for applying an input signal between said base and emitter electrodes; means providing a direct current supply source having a first and a second terminal; said second terminal being connected to a point of ground potential in said circuit; load impedance means connected between said collector electrode and said first terminal for applying biasing potentials to said collector electrode and providing an output circuit for said transistor; means connecting said emitter electrode with said second terminal; and a temperature compensating T-network for stabilizing the operation of said transistor over a wide range of ambient temperature variation comprising a first and a second resistor connected in series in the order named directly between said base and collector electrodes, and a thermistor of relatively low resistance connected from the junction of said first and second resistors to the second terminal of said supply source, said first resistor having resistance of a large enough magnitude to prevent shunting of an applied input signal to ground, and said second resistor having resistance larger than the resistance of said first resistor and of a sufficient magnitude to limit current flow through said thermistor to a value whereby the resistance of said thermistor is not appreciably varied by current flow therethrough.

References Cited in the file of this patent

UNITED STATES PATENTS 2,431,306 Chatterjea et al. -------- Nov. 25, 1947
2,468,082 Chatterjea et al. -------- Apr. 26, 1949

OTHER REFERENCES

Shea text, "Principles of Transistor Circuits," pages 164–179, pub. 1953 by John Wiley & Sons, Inc., N. Y. C.